Dec. 17, 1940.  N. J. POUX  2,225,286
SLIDE FASTENER
Filed Oct. 18, 1937
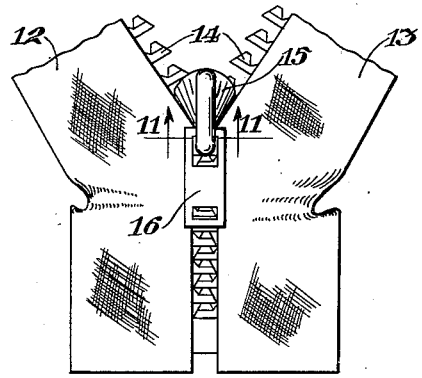
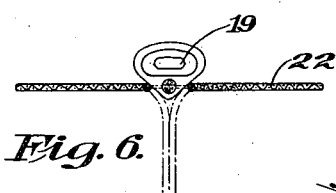
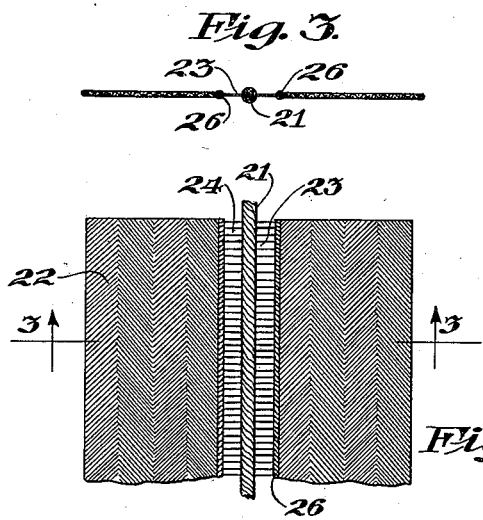
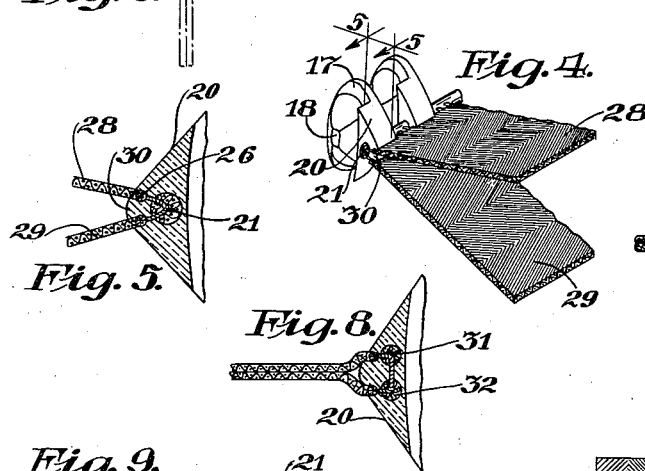
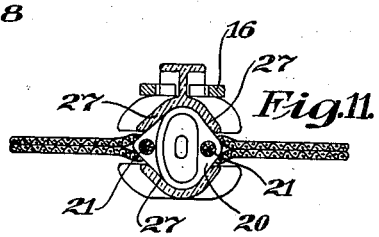
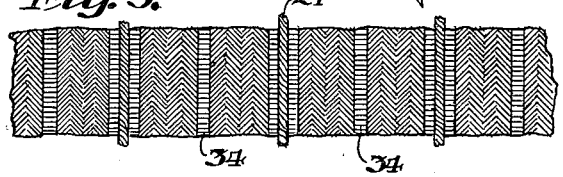
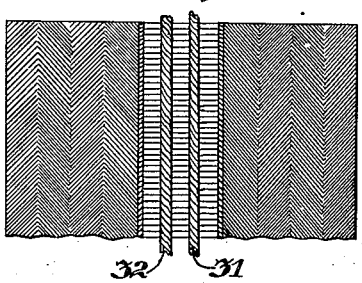
INVENTOR.
*Noel J. Poux*
BY *Kelley Chisholm*
ATTORNEYS.

Patented Dec. 17, 1940

2,225,286

UNITED STATES PATENT OFFICE 2,225,286

SLIDE FASTENER

Noel J. Poux, Meadville, Pa., assignor to Talon, Inc., a corporation of Pennsylvania Application October 18, 1937, Serial No. 169,565

8 Claims. (Cl. 24—205)

This invention relates to slide fasteners, and especially to an improved construction of non-metallic interlocking elements, and also to methods of forming such interlocking elements on the stringer. The invention also embodies an improved slider to actuate the interlocking elements into engagement.

Heretofore in the design of interlocking elements especially of the non-metallic type, difficulty has been experienced in making the elements of a small size to provide a neat application in practice, and at the same time, to have a structure in which the elements are securely held on the stringers.

Accordingly, it is the principal object of my invention to provide an improved fastener construction in which the elements or at least the visible portions thereof, have the minimum width and at the same time, have a secure and strong connection between the elements and the fabric stringers; also to provide an improved method of making such fasteners.

It is an object of my invention to construct stringers upon which are attached interlocking elements in such a way as to make it convenient to mold the fastener elements directly on them.

A further object is to provide a construction that will permit the attaching portions of the fastener elements to be the shortest possible and thereby effect a narrowing of the fastener elements without affecting their secure attachment to the stringers.

Another object of my invention is to provide stringers suitably woven in series as to permit the molding of a plurality of fastener element rows thereon.

A still further object of my invention is to provide a fastener in which the dimensions of the slider may be the smallest possible.

Preferred embodiments of the present invention will be hereinafter described with reference to the accompanying drawing given merely by way of example, and in which:

Fig. 1 is a plan view of my invention;

Fig. 2 shows a preferred form of fabric stringer;

Fig. 3 is a section on the line 3—3 of Fig. 2;

Fig. 4 is a perspective detail view of my improved fastener;

Fig. 5 is a section on the line 5—5 of Fig. 4, and illustrates the method of molding said stringers and beads in the legs of the interlocking elements;

Fig. 6 is a cross-section showing one suitable arrangement of the stringer in the molding operation;

Fig. 7 is a view showing a modified form of stringer design;

Fig. 8 is a cross-section illustrating a modified form of attaching said stringers to said fastener elements;

Fig. 9 is a view illustrating the manner in which a series of stringers may be woven together;

Fig. 10 is a view showing multiple molding of fasteners on the stringers illustrated in Fig. 9; and Fig. 11 is a section on line 11—11 of Fig. 1.

My improved slide fastener as seen in Fig. 1 may be generally described as having two stringers 12 and 13 with fastener elements 14 extending from adjacent edges of the stringers, the visible portions of said elements being much narrower than the customary slide fastener design. A slider 15 which is correspondingly narrower, rides over the interlocking elements to engage or disengage them and is operated by a convenient pull tab 16. The bulk of each of the fastener elements comprises the interlocking or head portion 17, which has a projection 18 on one side and a correspondingly shaped recess 19 on the opposite side, which may be of any of the shapes now used in commercial fasteners. The manner of interlocking by mutual engagement of the projections on one side by the sockets on the opposite side is well understood and need not be further described.

Instead of the usual legs or attaching arms which extend in a parallel direction from the interlocking head over the edge of the tape, the sides of my improved fastener element slope abruptly toward the tape to provide inclined straight or rounded sides 20. They overlap the tape just slightly more than enough to cover the bead 21 which may be relatively smaller than beads at present used on slide fasteners.

The stringer shown in Figs. 2 and 3 comprises a fabric tape 22 with an intermediate section 23 having the longitudinal threads omitted so as to provide spaces 24 between the cross-wise extending threads. The bead 21 extends through this section and is attached to cross-wise extending threads and is preferably woven integral therewith. Also threads 26 slightly larger than the longitudinal threads are located along the sides of the section which has the longitudinal threads omitted. As shown in Fig. 5 the molded element preferably extends far enough to cover the threads 26. In some cases this may be a more desirable construction than that shown in Fig. 6 for the reason that the longitudinal threads 26 embedded in the molded elements will tend to prevent buckling or wrinkling of the tape. The slider, as shown in Fig. 11, is of such size and shape as to fit over the heads of the interlocking elements and instead of the usual flat wing with side flanges, the wings are almost a V-shape cross-section with inclined sides 27 adapted to bear against the inclined surfaces 20 of the fastener elements.

The fastener elements consist of molded material molded directly in place on the stringers, each of the stringers in the fastener consisting of two thicknesses of material 28, 29, which are folded with the bead 21 located at the fold line but adjacent the fold the two thicknesses are somewhat spaced apart to provide a space 30 which is occupied by the molded material of the element, that is, the molded material extends into that space. The bead 21 is thus surrounded by and embedded in the molded material as are also those cross-wise threads which extend through the fastener members. The two thicknesses of material may, if desired, be sewn or cemented together adjacent the fastener elements or they may be left apart in accordance with the particular manner of applying the fastener in an article to be fastened.

In molding the fastener members, the tape 22 may be arranged in some such manner as shown in Fig. 6, with the mold parts on one side of the tape and the projecting nozzle for the moldable material on the other side of the tape, it being understood that the material is forced through the spaces between the cross-threads in that section of the tape where there are no longitudinal threads and directly into the mold cavities on the other side of the tape.

In the modification shown in Fig. 8, instead of only one longitudinal bead, I provide two relatively smaller beads 31, 32, otherwise the construction and method of making it are substantially the same. When a stringer of this type is used there are thus available more spaces in which the longitudinal threads are omitted as will be seen from Fig. 7. In making up the tape stringers, I preferably weave them in a wide strip as shown in Fig. 9, with narrow sections 34 where the longitudinal threads are omitted. In making up the fastener, the strips are cut along these sections 34 to divide them up into individual fastener stringers.

My modified fastener, therefore, has many advantages which will be apparent to those skilled in the art. For any given size and weight of material, it is relatively much stronger than fasteners heretofore known, in which the attaching portions extend around the edge of the stringer. In the present case, the stringer itself is in effect wrapped around a portion of the element.

While I have shown and described some embodiments which my invention may assume in practice, it will be understood that variations may be made within the scope of the invention, for example, in some cases, the advantageous features of my invention may be realized in the molding or die-casting of metallic elements to a stringer. Furthermore, many of the advantages of the invention may be secured by using a single thickness tape having some of the longitudinal threads omitted along the beaded edge so that the material of the molded element can flow around these threads in the manner as illustrated.

What I claim as my invention is:

1. In a slide fastener of the class described, fabric stringers and a series of fastener elements molded on the edge of each of said stringers, certain of the threads of said fabric being individually completely embedded in and individually surrounded by the material of each fastener element.

2. In a slide fastener of the class described, a pair of fabric stringers each having a series of fastener elements molded on one edge, each stringer having two thicknesses of material extending from said fastener elements and in spaced relationship within the confines of said elements, each of said thicknesses having threads individually embedded in and completely surrounded by the material of each element, said material also occupying a space between said thicknesses.

3. In a slide fastener of the class described, a pair of fabric stringers having cooperating series of fastener elements on their adjacent edges, said elements being molded on said edges with portions of the fabric embedded in the material of the fastener element, said embedded portions including a longitudinally extending bead, said bead being connected to the body of the fabric stringer by cross-wise extending threads, there being no longitudinally extending thread adjacent said bead, the molded material individually surrounding said cross-wise extending threads.

4. In a slide fastener of the class described, a pair of fabric stringers having cooperating series of fastener elements molded in position along adjacent edges of each of the stringers, said stringers comprising two thicknesses of tape folded but spaced at least slightly adjacent the fold, said fastener elements being secured at the folded edge, and the molded material of the fastener elements extending into the space between the two tape thicknesses adjacent the fold.

5. In a slide fastener of the class described, a pair of fabric stringers having cooperating series of fastener elements molded in place along their adjacent edges, each stringer comprising a double thickness folded piece of material, the two thicknesses being integrally connected by cross-wise extending threads, and the two thicknesses being slightly spaced apart providing a hollow space adjacent the folded edge, a part of the material of the molded elements individually surrounding some of such threads and another part of the material occupying said hollow space.

6. The combination defined in the preceding claim in which a longitudinally extending bead is embedded in the fastener elements at the junction line of the two thicknesses of material.

7. In a slide fastener of the class described, a fastener element having an interlocking portion consisting of an interlocking head portion on one side and a recess on the opposite side, and an attaching portion which is relatively much narrower than said interlocking portion, said attaching portion having individually embedded therein certain of the threads of a fabric stringer, said threads being individually surrounded and contacted by the material of the fastener element.

8. The combination defined in the preceding claim wherein there is a slider which rides only on the head portions and is located wholly between the fabric stringers.

NOEL J. POUX.